US010392930B2

(12) United States Patent
Dang (10) Patent No.: US 10,392,930 B2
(45) Date of Patent: Aug. 27, 2019

(54) CHANNEL ESTIMATION IN MUD PULSE TELEMETRY (71) Applicant: HALLIBURTON ENERGY SERVICES, INC., Houston, TX (US)

(72) Inventor: Wenbing Dang, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/113,387

(22) PCT Filed: Jul. 24, 2015

(86) PCT No.: PCT/US2015/042138
§ 371 (c)(1),
(2) Date: Jul. 21, 2016

(87) PCT Pub. No.: WO2017/019002
PCT Pub. Date: Feb. 2, 2017

(65) Prior Publication Data
US 2017/0234124 A1 Aug. 17, 2017

(51) Int. Cl.
E21B 47/18 (2012.01)
G01V 11/00 (2006.01)
E21B 47/024 (2006.01)
E21B 47/06 (2012.01)
E21B 49/00 (2006.01)
E21B 49/08 (2006.01)

(52) U.S. Cl.
CPC ............ *E21B 47/18* (2013.01); *E21B 47/024* (2013.01); *E21B 47/06* (2013.01); *E21B 47/065* (2013.01); *E21B 49/00* (2013.01); *E21B 49/08* (2013.01); *G01V 11/002* (2013.01); *E21B 2049/085* (2013.01)

(58) Field of Classification Search
None
See application file for complete search history.

(56) References Cited

U.S. PATENT DOCUMENTS 4,227,152 A * 10/1980 Godard ............... H04L 25/0305
333/18
5,361,102 A * 11/1994 Roy ....................... H04N 5/211
348/611
7,453,372 B2 11/2008 Hentati et al.
8,302,685 B2 11/2012 Reyes et al.
(Continued)

OTHER PUBLICATIONS

International Search Report and Written Opinion; PCT Application No. PCT/US2015/042138; dated Apr. 26, 2016.

*Primary Examiner* — Adolf Dsouza
(74) *Attorney, Agent, or Firm* — Polsinelli PC (57) ABSTRACT Systems, methods, and computer-readable media for channel estimation in mud pulse telemetry based on a preamble waveform. A system located at a first location of a wellbore can receive, from a second device located at a second location of the wellbore, a signal including a Golay preamble waveform and data symbols. The Golay preamble waveform can be based on Golay complementary codes. Based on a measurement associated with the signal, the system can then detect the Golay preamble waveform in the signal. Next, the system can estimate a characteristic of a communication channel between the first location and the second location based on the detected Golay preamble waveform.

21 Claims, 8 Drawing Sheets (56) References Cited

U.S. PATENT DOCUMENTS

| | | | |
|---|---|---|---|
| 2005/0036541 A1* | 2/2005 | McKown | H04L 25/03057 375/233 |
| 2007/0132606 A1 | 6/2007 | Reckmann et al. | |
| 2007/0189119 A1* | 8/2007 | Klotz | E21B 47/18 367/83 |
| 2008/0074948 A1 | 3/2008 | Reckmann | |
| 2008/0112501 A1 | 5/2008 | Diaz Fuente et al. | |
| 2013/0114764 A1* | 5/2013 | Zhang | H04L 1/0025 375/340 |

\* cited by examiner

CHANNEL ESTIMATION IN MUD PULSE TELEMETRY

CROSS-REFERENCE TO RELATED APPLICATIONS

This application is a national stage entry of PCT/US2015/042138 filed Jul. 24, 2015, said application is expressly incorporated herein in its entirety.

TECHNICAL FIELD

The present technology pertains to channel estimation in mud pulse telemetry and more specifically to a Golay preamble waveform for channel estimation in mud pulse telemetry.

BACKGROUND

Mud pulse telemetry generally involves telemetry of information from a bottom location of a wellbore to a surface of the earth during oil well drilling operations. The information communicated through mud pulse telemetry can include various parameters, such as pressure, temperature, direction of the wellbore, deviation of the wellbore, density, porosity, characteristics of the wellbore layers, etc. This information can be extremely helpful for optimizing the efficiency and accuracy of a drilling operation.

Unfortunately, communications in mud pulse telemetry typically experience significant noise which can greatly distort the data and signals transmitted. In order to minimize distortion and inter-symbol interference, current solutions in mud pulse telemetry generally use very low data transmission rates. Accordingly, current solutions are greatly limited by low data rates, signal distortion, and inter-symbol interference.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to estimate a mud channel for mud pulse telemetry in real time or while performing drilling operations. The estimated mud channel can be used to combat inter-symbol interference and achieve higher data rates. The channel estimate can be obtained using a Golay preamble waveform transmitted with or prior to the data symbols. The Golay preamble can be constructed with a desired power spectrum, such as a flat or smooth power spectrum, for better channel estimation performance. The structure of the Golay preamble waveform can enable reliable preamble detection even in the presence of inter-symbol interference and high pump noises. Moreover, the initial channel estimate using the Golay preamble waveform can ensure successful detection of early data packets, which can be highly informative, and enable faster convergence of the adaptive channel estimation which can help track the time-variant channels and decode the later data packets.

Disclosed are systems, methods, and computer-readable storage media for channel estimation in mud pulse telemetry based on a preamble waveform. A first device (e.g., a transducer, transceiver, processor, pulser, sensor, etc.) located at a first location within or proximate to a wellbore can receive a signal including a Golay preamble waveform from a second device (e.g., pulser, transducer, transceiver, processor, sensor, etc.) located at a second location within or proximate to the wellbore.

The first location can be within a distance or vicinity of a surface or top location or end of the wellbore, and the second location can be within a distance or vicinity of a downhole or bottom location or end of the wellbore. The first location can be within a distance or vicinity of a downhole or bottom location or end of the wellbore, and the second location can be within a distance or vicinity of a surface or top location or end of the wellbore. Thus the first device can be within a proximity of the surface of the wellbore and the second device can be within a proximity of a downhole location, such as a bottom of the wellbore or a bottom of a drilling device in the wellbore, of the wellbore.

As previously noted, the signal can include a Golay preamble waveform. The Golay preamble waveform can be based on Golay complementary codes. The signal can also include data symbols. The signal can include a Golay preamble followed by one or more data symbols. The Golay preamble can include a tailend, which can define the end of the Golay preamble in the signal. Moreover, the Golay preamble waveform can have a flat or near flat power spectrum.

Next, the first device can detect the Golay preamble waveform in the signal based on a measurement associated with the signal. The measurement can be a transducer measurement of the signal. The first device can identify a portion of the signal corresponding to the Golay preamble waveform and/or a portion of the signal corresponding to one or more data symbols. The first device can separate the Golay preamble waveform from one or more data symbols associated with the signal.

Then, based on the detected Golay preamble waveform, the first device can estimate a characteristic of a communication channel between the first location and the second location. The characteristic of the communication channel can include a noise, a distortion, a delay, an attenuation, a phase shift, a signal-to-noise ratio, an impulse response, an impedance parameter, etc. The characteristic of the communication channel can include a transfer function.

The communication channel can be a mud channel or mud flow path. The first device can estimate a mud channel response for the mud channel or mud flow path. The first device can generate a maximum likelihood (ML) estimate of a mud channel response. Moreover, the first device can use the channel estimate to decode the data symbols and verify the Golay preamble design.

Figure 1:
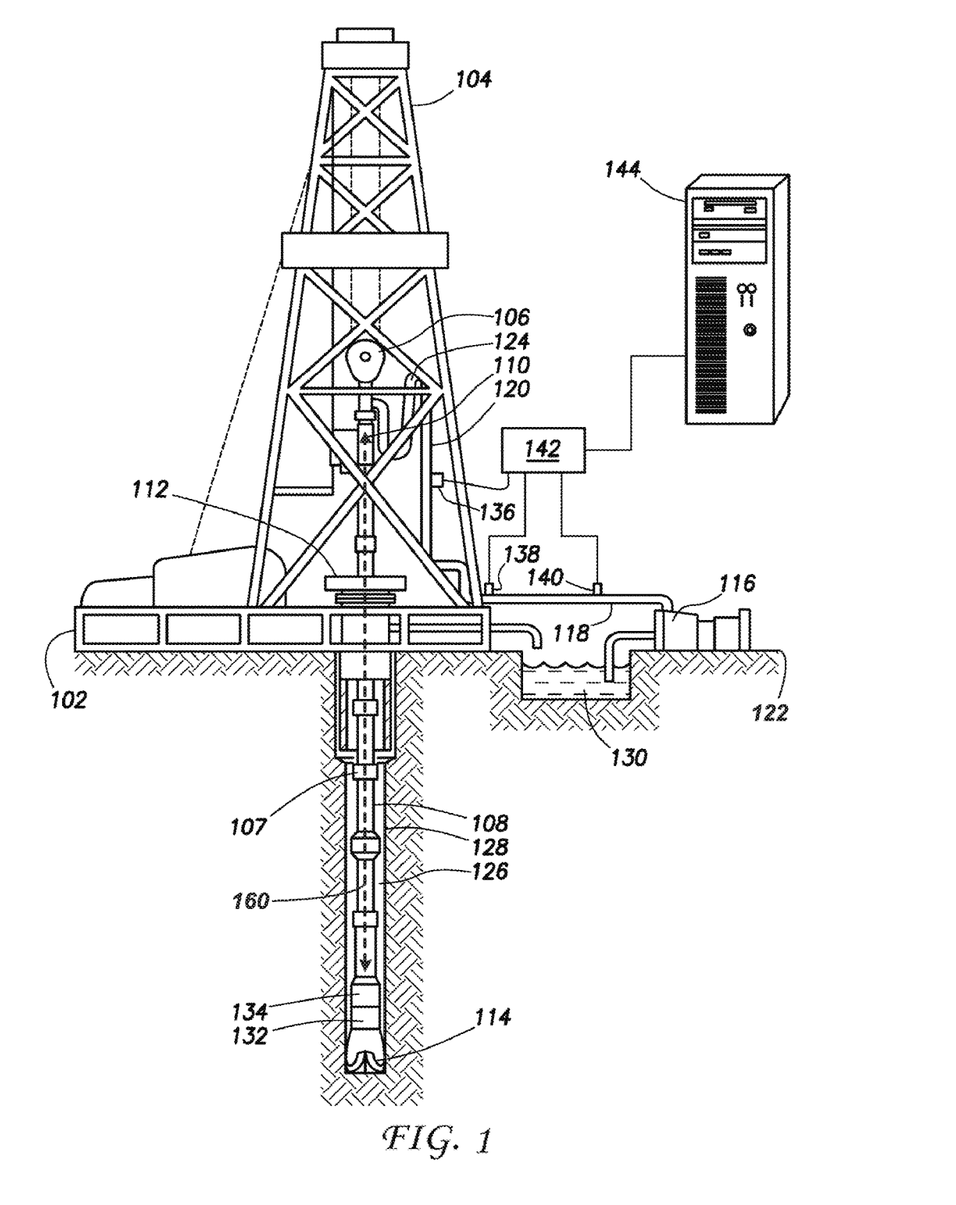
FIG. 1 illustrates a schematic diagram of an example system for channel estimation at a surface location or downhole location of a wellbore.

The present disclosure is described in relation to the subterranean well that is depicted schematically in FIG. 1. A drilling platform 102 can be equipped with a derrick 104 that supports a hoist 106. The drilling platform can be supported directly on land as shown or on an immediate platform if at sea. A string of drill pipes are connected together by tool joints 107 so as to form a drill string 108. The hoist 106 suspends a top drive 110 that can rotate the drill string 108 and can lower the drill string through the wellhead 112. Connected to the lower end of the drill string 108 is a drill bit 114 that has been advanced into the earth from the earth's surface 122 to form wellbore 128. The drill bit 114 can be located at a bottom, distal end of the drill string 108 and can be rotated by rotating the drill string 108, by use of a downhole motor near the drill bit, or by a combination of each method. Drilling fluid (also referred to as "mud") can be pumped by mud pump 116 through flow line 118, stand pipe 120, goose neck 124, top drive 110, and down through the drill string 108 at high pressures and volumes to emerge through nozzles or jets in the drill bit 114. The drilling fluid can then travel back up the wellbore 128 via the annulus 126 formed between the exterior of the drill string 108 and the wall of wellbore 128. At the surface 122, the drilling fluid can exit the annulus 126 through a blowout preventer (not specifically shown) and can drain into a mud pit 130 on the surface 122. On the surface 122, the drilling fluid can be cleaned and recirculated down the drill string 108 by mud pump 116.

As shown in FIG. 1, the drill string 108 can support several components along its length. In wells employing measurement while drilling (MWD)/logging while drilling (LWD), a sensor unit 132 can collect data regarding the formation properties and/or various drilling parameters near the drill bit 114. The collected data can include such properties as formation fluid density, temperature, pressure, resistivity, porosity, and azimuthal orientation of the drill bit 114 or drill string 108. Furthermore, the sensor unit can contain one or more transducers for measuring the pressure within the drill string 108. Other sensor units can be disposed along the drill string 108 which can be similarly enabled to sense nearby characteristics and conditions of the drill string 108, formation fluid, and surrounding formation. Regardless of which conditions or characteristics are sensed, data indicative of those conditions and characteristics is either recorded downhole, for instance at a processor within sensor unit 132 for later download, or communicated to the surface either by mud pulse telemetry, wire, wirelessly or otherwise. Power for the sensor units and communication module may be provided by batteries housed therein. Alternatively, power may be generated from the flow of drilling mud through the drill string 108 using turbines as is known in the art.

The sensor unit 132 can be coupled to the communication module 134 that can transmit the collected data to the surface 122 via communication path 160. Alternatively, sensor unit 132 and communication module 134 can receive signals from the surface 122 or can transmit/receive data to or from other sensor units and communication modules disposed along the drill string 108. In wells employing mud pulse telemetry, communication module 134 can modulate the resistance to the incoming flow of drilling fluid to generate pressure pulses (positive/negative pulse systems) or a carrier frequency (continuous wave pulse system) that propagate to the surface 122. Various transducers, such as transducers 136, 138 and 140, can convert the pressure signal into electrical signals for a signal digitizer 142 (e.g., an analog to digital converter). While three transducers 136, 138 and 140 are illustrated at specific locations, a greater or fewer number of transducers may be used and may be disposed at different locations of the surface 122 or within the wellbore 128. The digitizer 142 supplies a digital form of the pressure signals to one or more processor 144 or some other data processing device. Processor 144 operates in accordance with software (which may be stored on a computer-readable storage medium) to process and decode the received signals.

As previously discussed, communication module 134 can generate a traveling pressure signal representative of downhole parameters measured by sensor unit 132. In an ideal system, each and every pressure pulse created downhole would propagate upstream and be easily detected by a transducer at the surface. However, drilling fluid pressure fluctuates significantly and contains noise from several sources (e.g., bit noise, torque noise, and mud pump noise, etc.). To combat noise and interference, communication module 134 can generate and transmit a signal including a Golay preamble waveform used to estimate the communication channel. The signal can be transmitted as a pressure signal by modulating the flow of mud using any mud pulse telemetry technique known in the art such as negative pulse, positive pulse, continuous wave, or any combination thereof. The pressure signal can travel along communication path 160 toward the surface 122 of the wellbore 128. Once the signal has reached the surface 122 of the wellbore 128, the signal can be measured by at least one of transducers 136, 138, and 140. Data from the signal, which can include the Golay preamble, data collected by sensor unit 132, and/or other data symbols, can be digitized by digitizer 142 and sent (wired or wirelessly) to one or more processor 144 for recordation and/or processing. Upon receipt of the signal data, processor 144 can perform detection of the Golay preamble waveform and/or other portions of the signal and can estimate characteristics of the communication channel. Moreover, other communication modules and sensor units disposed along the drill string 108 can receive and process the signal to estimate the communication channel.

Alternatively or in addition, flow of the drilling fluid that is pumped via mud pump 116 can be modulated at the surface 122 to generate and transmit a signal including a Golay preamble waveform. The signal can be transmitted using mud pulse telemetry, by varying the rotation rate of the drill string 108, or by any other technique known in the art. The signal can travel along communication path 160 toward the bottom of the wellbore 128. The signal can be received by a transducer located within or proximal to sensor unit 132 or communication module 134. Data from the signal received by the transducer can be digitized and transmitted (wired or wirelessly) to a processor disposed within sensor unit 132 or communication module 134. The processor can perform detection of the Golay preamble waveform and/or other portions of the signal and can estimate characteristics of the communication channel. Moreover, other communication modules and sensor units disposed along the drill string 108 can receive and process the signal to estimate the communication channel.

Although the presently disclosed channel estimation technique using Golay preambles was described above with respect to MWD/LWD using mud pulse telemetry, it can be suitably employed with any method of communication between a downhole and a surface location, as well as for communications between downhole locations. For example, the principles disclosed herein can apply to wireline communications, wireless communications, acoustic communications, structural members, or other signal transmissions where the waveform travels from downhole to surface, surface to downhole, or between communication points of the pipe, and encounters attenuation and distortion. For example, if communicating via wireline communications, the system can utilize wireline deployed as an independent service upon removal of the drill string, the drill string itself, or other conductive mechanisms for communicating. If wirelessly, a downhole transceiver (antenna) can be utilized to send data to a topside transceiver (antenna), or vice versa.

Figure 2A:
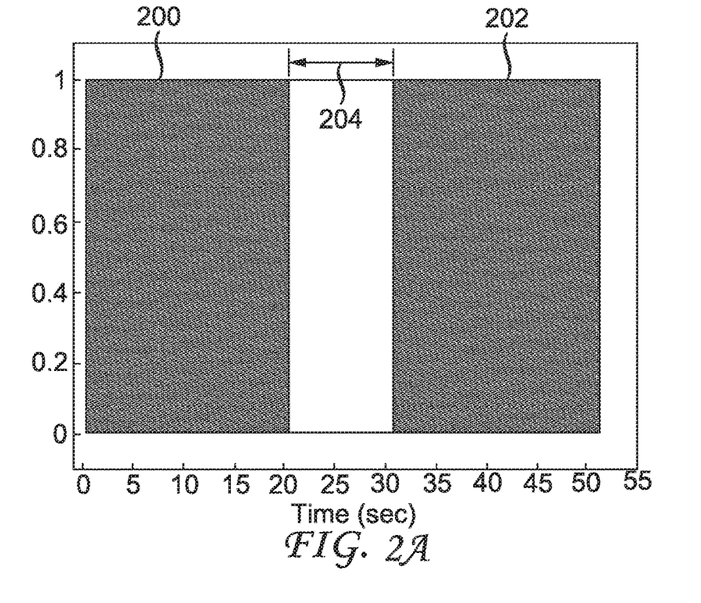
FIG. 2A illustrates a time domain representation of a Golay preamble waveform.
Figure 2B:
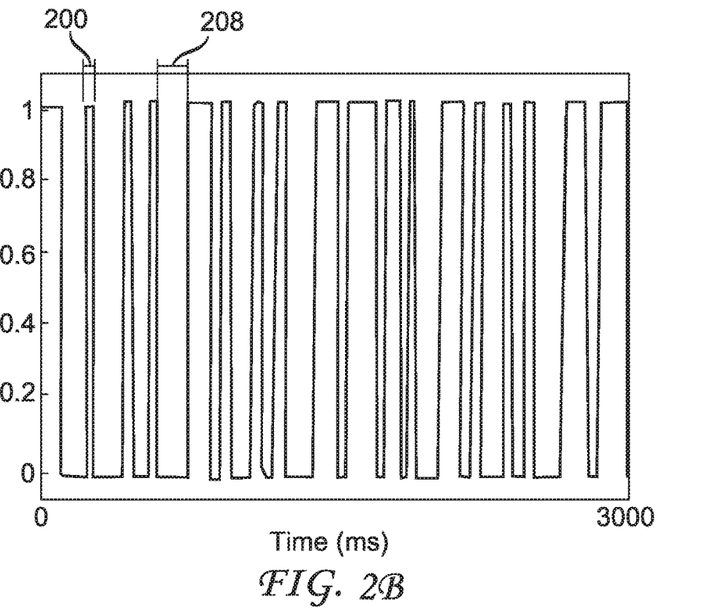
FIG. 2B illustrates the first three seconds of a time domain representation of a Golay preamble waveform.

To allow for channel estimation in accordance with the present disclosure, a signal containing a Golay preamble waveform can first be constructed. FIG. 2A illustrates a time domain representation of a Golay preamble, whose duration can vary based on design criterions. Similarly, FIG. 2B illustrates the first three seconds of the time domain representation of the Golay preamble. The Golay preamble can be formed using two length-N Golay complementary codes. Pulse-position modulation (PPM) can be used to create PPM signals 200 and 202 which emulate the bit sequences in the Golay complementary codes, although other forms of signal modulation such as pulse-amplitude modulation, pulse-code modulation, pulse-density modulation, pulse-width modulation, etc., are also anticipated. As illustrated in FIG. 2B, the pulse width 206 and waiting period 208 of the PPM signals can be dynamically chosen to represent the length of identical bits, or runs, in the Golay complementary codes.

Based on the constraints of the processor, pulser, transceiver or receiver, and/or sensor, each pulse width can be within a range and each waiting period can be subject to some minimum time duration. Accordingly, the minimum time between pulses can be set to the sum of the pulse width and the waiting period. Furthermore, to avoid time-aliasing in forming the sum of autocorrelations, the transmission of PPM signals 200 and 202 can be separated by at least the communication channel's delay spread 204. Thus, a greedy algorithm can be used to generate an implementable PPM waveform which complies with the constraints to approximate the ideal Golay complementary codes with an arbitrary bit width.

Figure 2C:
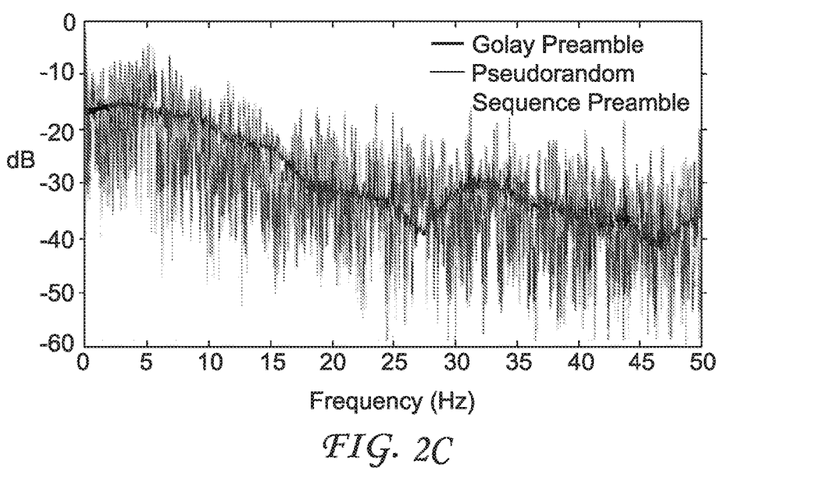
FIG. 2C illustrates a graphical comparison between the power spectrum of an example Golay preamble and the power spectrum of a preamble encoded by a pseudorandom sequence.

FIG. 2C illustrates a graphical comparison between the power spectrum of an example Golay preamble and the power spectrum of a preamble encoded by a pseudorandom sequence. The Golay preamble and the preamble encoded by a pseudorandom sequence can both be subject to the following constraints: pulse width≥40 ms and pulse width≤200 ms, waiting period≥50 ms, and minimum time between pulses=120 ms. Furthermore, the bit width of the length-512 Golay complementary codes can be 40 ms, and the bit width of the pulser can be 2 ms. As depicted in FIG. 2C, the Golay preamble can have a slow-decaying and smooth power spectrum at most frequencies.

Figure 3A:
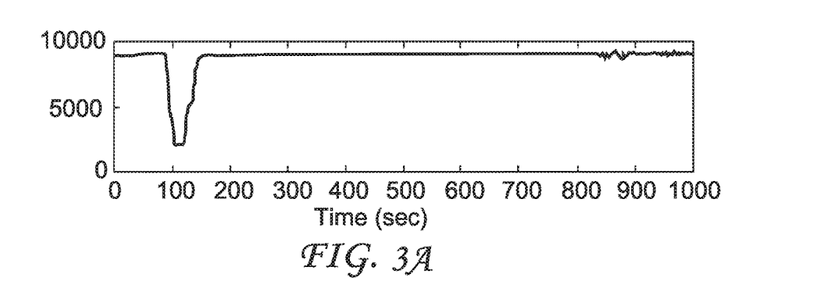
FIG. 3A illustrates an example signal containing a Golay preamble waveform received by a first device.
Figure 3B:
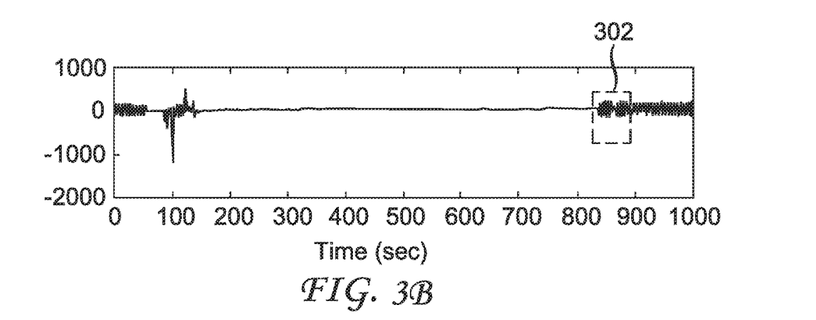
FIG. 3B illustrates an example of the processed and down-converted signal.

Once the signal containing the Golay preamble waveform is received, the Golay preamble can be detected to facilitate estimation of the communication channel. FIG. 3A illustrates an example signal containing a Golay preamble waveform received by a first device. Before detecting the Golay preamble, the received signal can be processed and down-converted to reduce the noise power. An example of the processed and down-converted signal is illustrated in FIG. 3B, which contains region 302 identifying the Golay preamble waveform.

Figure 3C:
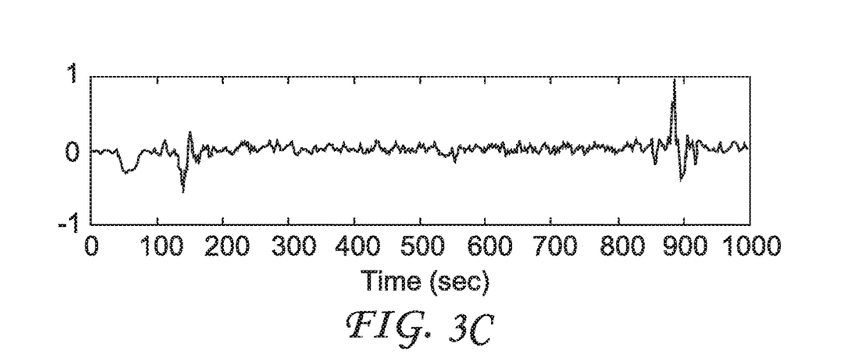
FIG. 3C illustrates an example output signal of the first detector.

The processed and down-converted signal can undergo detection by a first detector. The first detector can calculate the weighted sum of the autocorrelation of the processed and down-converted signal over several periods. The first detector can perform the aforementioned calculation using equations (1) and (2) below, where $r[k]$ is the processed and down-converted signal, N is the number of chips contained in the PPM signals 200 and 202, and $W_{i,j}$ is the weight optimized to obtain higher detection probability. An example output signal of the first detector is illustrated in FIG. 3C.

$$d_1[k] = \sum_{i \le 1, j \le 10} W_{i,j} d_{i,j}[k] \qquad (1)$$

$$d_{i,j}[k] = \sum_{n=0}^{N-1} r\left[k - n - (i-1)\frac{N}{4}\right] * r\left[k - n - (j-1)\frac{N}{4}\right] \qquad (2)$$

Figure 3D:
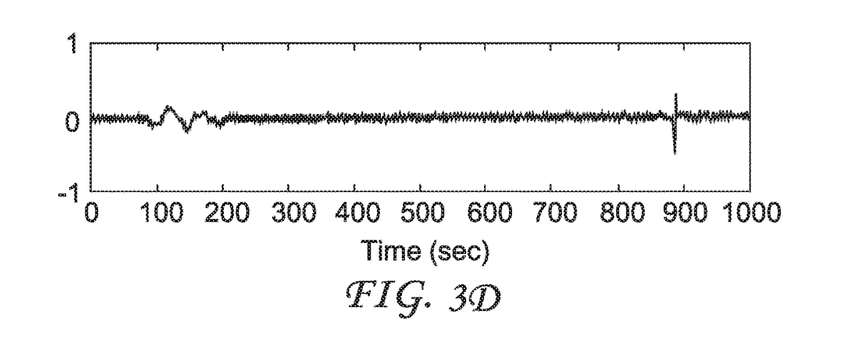
FIG. 3D illustrates an example output signal of the second detector.

Subsequently or simultaneously, the processed and down-converted signal can undergo detection by a second detector. The second detector can run a cross-correlation of the processed and down-converted signal and a reference signal. The second detector can perform the aforementioned cross-correlation using equation (3) below, where A is the number of chips contained in the time gap between the PPM signals 200 and 202, and $x[n]$ and $y[n]$ represent PPM signals 200 and 202 down-converted to the chip frequency of $r[k]$. FIG. 3D illustrates an example output signal of the second detector.

$$d_2[k] = \sum_{n=0}^{N-1} r[k-n]y[n] + \sum_{n=0}^{N-1} r[k-n-(N+\Delta)]x[n] \qquad (3)$$

Figure 3E:
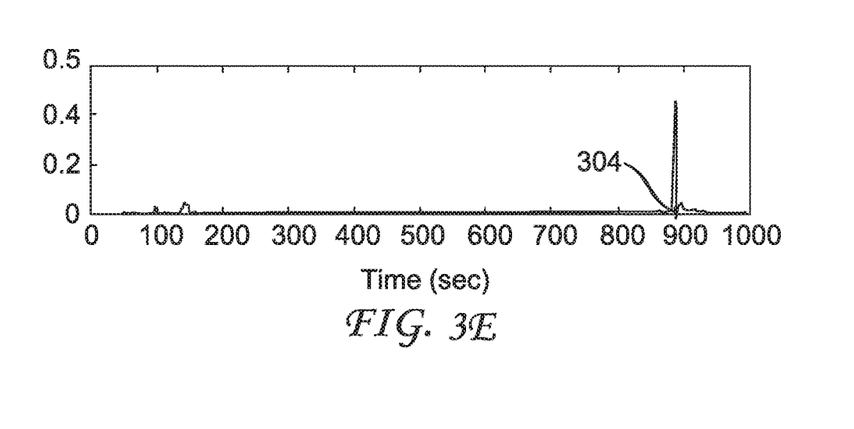
FIG. 3E illustrates the absolute value of the product of the signals output by the first and second detectors.

As illustrated in FIG. 3E, the absolute value of the signals output by the first and second detectors can be multiplied to further suppress noise and increase the Golay preamble detection probability. The signal in FIG. 3E shows that the tail end of the Golay preamble waveform occurs at time 304.

Once the tail end of the Golay preamble waveform is detected, an algorithm can be used to automatically select a data section (e.g., the Golay preamble) of the received signal for use in channel estimation. The beginning and/or entire waveform of the Golay preamble can be detected. Furthermore, different data sections of the received signal, such as the data symbols, can be detected and selected for channel estimation in addition to or in place of the Golay preamble.

The steps disclosed with respect to FIGS. 3A-E are provided for explanation purposes, and can be implemented in any combination thereof, including combinations that exclude, add, or modify certain steps. One or more thresholds can be applied to the output signal of the first and/or second detectors prior to multiplication. Furthermore, a single detector can be used.

Figure 4A:
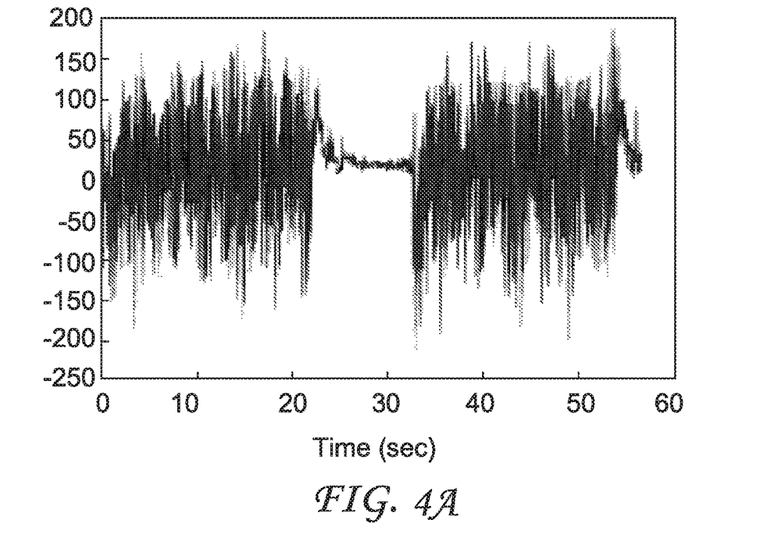
FIG. 4A illustrates a data section of the signal received by the first device selected for channel estimation.
Figure 4B:
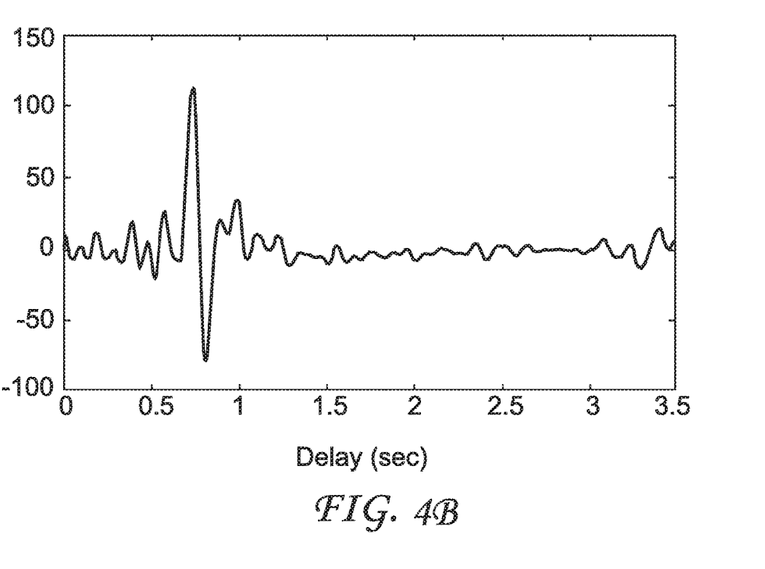
FIG. 4B illustrates a maximum likelihood estimate of the delay in the communication channel of a flowloop system.

FIG. 4A illustrates the data section of the signal received by the first device selected for channel estimation. The selected data section can be modeled as the Golay preamble waveform convolved with the response of the communication channel. A least squares algorithm can be used to generate a maximum likelihood estimate of the response of the communication channel. FIG. 4B illustrates the maximum likelihood estimate of the delay in the communication channel of a flowloop system. Although FIG. 4B shows the channel delay, various other communication channel characteristics can be determined including a noise, a distortion, a delay, an attenuation, a phase shift, a signal-to-noise ratio, an impulse response, an impedance parameter, pressure, temperature, direction of wellbore, deviation of wellbore, density, porosity, layers and layer characteristics, etc.

Figure 5:
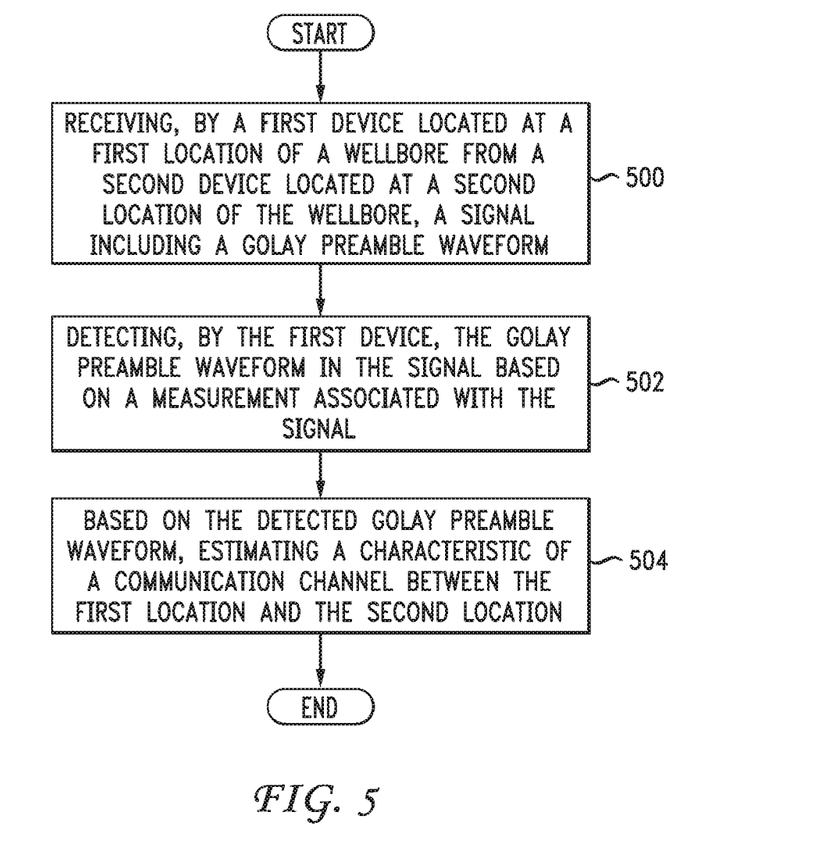
FIG. 5 illustrates an example method embodiment.

Having disclosed some basic system components and concepts, the disclosure now turns to the example method embodiment shown in FIG. 5. For the sake of clarity, the method is described in terms of processor 144, as shown in FIG. 1, configured to practice the method. The steps outlined herein can be implemented in any combination thereof, including combinations that exclude, add, or modify certain steps.

At step 500, the processor 144, which can be located at a first location within or proximate to a wellbore (e.g., wellbore 128), can receive or otherwise obtain a signal including a Golay preamble waveform from a device located at a second location of the wellbore. The Golay preamble waveform can be based on Golay complementary codes. Moreover, the Golay preamble waveform can also include one or more data symbols. The Golay preamble waveform can have a flat or near flat power spectrum.

The device located at the second location within or proximate to the wellbore can include a processor, a pulser, a transducer, a transceiver, and/or a sensor. The device can be a sensor and/or communication module, such as sensor unit 132 or communication module 134 illustrated in FIG. 1. The device can also generate the signal and/or Golay preamble waveform and transmit the signal with the Golay preamble waveform to the processor 144. The device can use PPM to create PPM signals which emulate the bit sequences in the Golay complementary codes. The generated PPM signals can include pulse widths and waiting periods that are dynamically chosen to represent the length of identical bits, or runs, in the Golay complementary codes.

The first location can be within or about a proximity or distance of a surface or top of the wellbore, and the second location can be within or about a proximity or distance of a bottom or downhole end of the wellbore. The first location can be a surface location of the wellbore and the second location can be a downhole location within the wellbore. The first location can be within or about a proximity or distance of a bottom or downhole end of the wellbore, and the second location can be within or about a proximity or distance of a surface or top of the wellbore. The first location can be a downhole location within the wellbore and the second location can be a surface location of the wellbore.

At step 502, the processor 144 can detect the Golay preamble waveform in the signal based on a measurement associated with the signal. The measurement can be a transducer measurement for the signal. Moreover, the processor 144 can apply a filter, such as a pump filter, to the signal prior to detecting the Golay preamble waveform.

The processor 144 can detect a location of the Golay preamble waveform within the signal, as well as a location for one or more remaining portions of the signal and/or data symbols within the signal. The processor 144 can separate the Golay preamble waveform from one or more data symbols in the waveform and identify the Golay preamble waveform in the signal. Moreover, the processor 144 can detect a beginning and/or tail end of the Golay preamble waveform in the signal.

The processor 144 can down-convert the received signal to reduce the noise power. The processor 144 can apply a first and/or a second detector to the received signal or the down-converted signal. The processor 144 can apply one or more thresholds to the outputs of the first and/or second detectors. Moreover, the processor 144 can multiply the absolute values of the outputs of the first and second detectors to suppress noise and obtain higher detection probability.

At step 504, the processor 144 can estimate a characteristic of a communication channel between the first location and the second location based on the detected Golay preamble waveform. The communication channel can be a mud channel or mud flow path, such as drilling mud that is pumped via mud pump 116 to a downhole mud motor. Moreover, the processor 144 can estimate a mud channel response based on the detected Golay preamble waveform.

The characteristic of the communication channel can include a noise, a distortion, a delay, an attenuation, a phase shift, a signal-to-noise ratio, an impulse response, an impedance parameter, pressure, temperature, direction of wellbore, deviation of the wellbore, density, porosity, characteristics of the wellbore layers, etc. The characteristic can be a transfer function.

The processor 144 can perform any of the above steps and operations, including steps 500, 502, and/or 504, during a drilling operation(s) or procedure(s). Processor 18 can perform steps 500-504 while drilling.

Figure 6A:
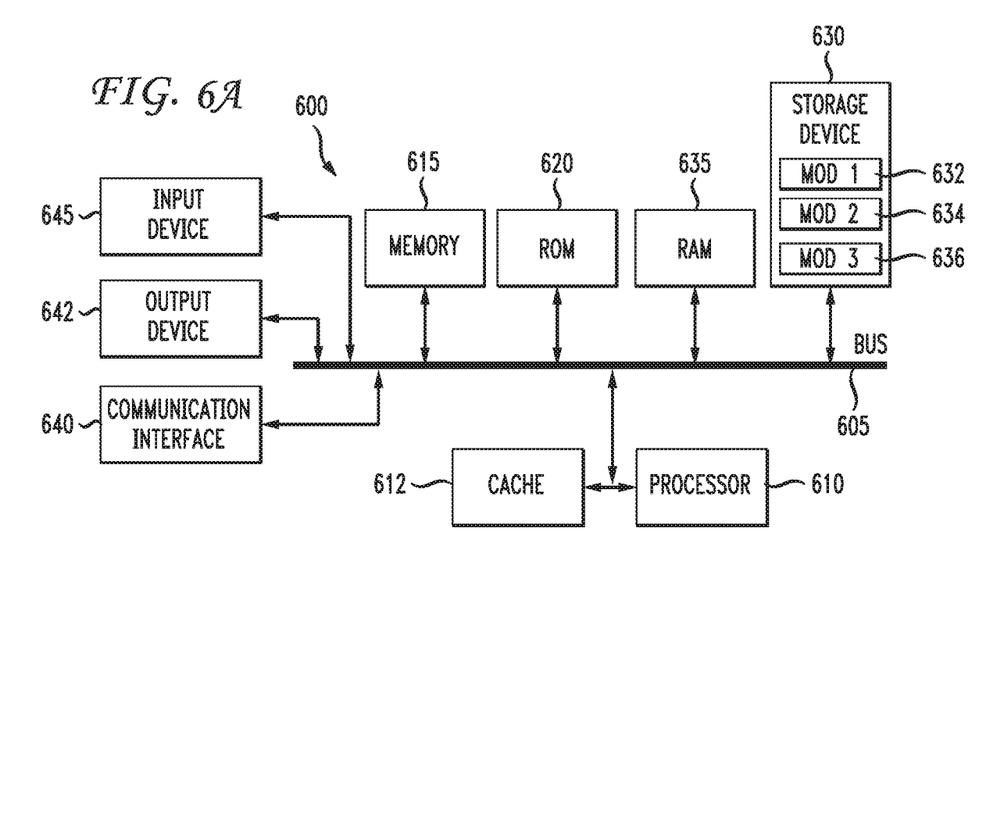
FIG. 6A and FIG. 6B illustrate schematic diagrams of example system embodiments.
Figure 6B:
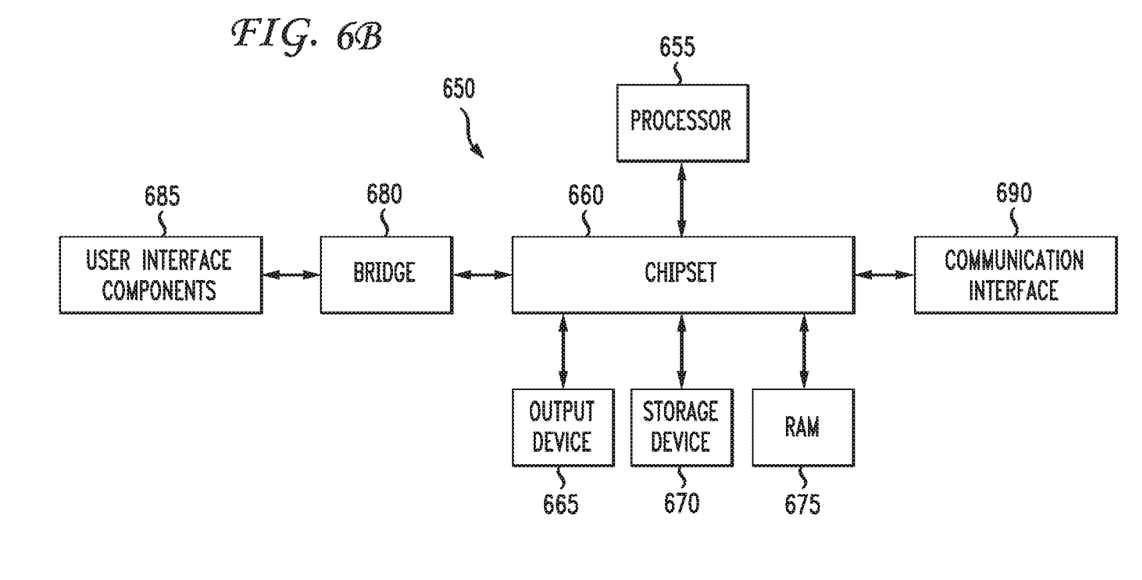

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. System 600 can include a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 642 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 can be computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. Chipset 660 can output information to output device 665, such as a display, and can read and write information to storage device 670, which can include magnetic media, and solid state media. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

Statements of the Disclosure Include:

Statement 1: A method comprising: receiving, by a first device located at a first location within a wellbore from a second device located at a second location within the wellbore, a signal comprising a Golay preamble waveform, the Golay preamble waveform being based on Golay complementary codes, detecting, by the first device, the Golay preamble waveform in the signal, and estimating, based on the detected Golay preamble waveform, a characteristic of a communication channel between the first location and the second location.

Statement 2: The method according to Statement 1, wherein detecting the Golay preamble waveform comprises separating the Golay preamble waveform from data symbols in the signal and identifying a portion of the signal corresponding to the Golay preamble waveform.

Statement 3: The method according to Statement 1 or 2, wherein the first location is within a proximity to a surface location of the wellbore and the second location is a downhole location of the wellbore.

Statement 4: The method according to any of the preceding Statements 1-3, wherein the Golay preamble waveform has a flat power spectrum.

Statement 5: The method according to any of the preceding Statements 1-4, wherein the communication channel comprises a mud flow path, and wherein estimating the characteristic of the communication channel comprises estimating a mud channel response.

Statement 6: The method according to any of the preceding Statements 1-5, wherein the characteristic of the communication channel comprises a transfer function.

Statement 7: The method according to any of the preceding Statements 1-6, wherein detecting the Golay preamble waveform comprises identifying a tail end of the Golay preamble waveform in the signal.

Statement 8: The method according to any of the preceding Statements 1-7, wherein detecting the Golay preamble waveform comprises identifying a location of the Golay preamble waveform within the signal.

Statement 9: The method according to any of the preceding Statements 1-8, further comprising selecting, based on the detected Golay preamble waveform, a portion of the signal for channel estimation, the portion comprising one or more data symbols, and estimating, based on the selected portion, a mud channel characteristic.

Statement 10: The method according to any of the preceding Statements 1-9, further comprising applying a filter to the signal prior to detecting the Golay preamble waveform.

Statement 11: The method according to any of the preceding Statements 1-10, wherein the detecting and estimating steps are performed during a drilling operation, the method further comprising determining one or more downhole characteristics of the wellbore, the downhole characteristics including at least one of a formation fluid density, a temperature, a pressure, resistivity, porosity, azimuthal orientation of a drill bit, and azimuthal orientation of a drill string.

Statement 12: The method according to any of the preceding Statements 1-11, wherein the first device and the second device comprise at least one of a processor and a pulser.

Statement 13: A system comprising a transducer residing at a first location within a wellbore to receive, from a communications component at a second location within the wellbore, a signal comprising a Golay preamble waveform, the Golay preamble waveform being based on Golay complementary codes; a processor coupled with the transducer to receive the signal from the transducer; and a computer-readable storage medium having stored therein instructions which, when executed by the processor, cause the processor to perform operations comprising: detecting the Golay preamble waveform in the signal; based on the detected Golay preamble waveform, estimating a characteristic of a communication channel between the first location and the second location Statement 14: The system according to Statement 13, wherein the measurement comprises a transducer measurement based on the signal.

Statement 15: The system according to Statement 13 or 14, wherein detecting the Golay preamble waveform comprises separating the Golay preamble waveform from the data symbols in the signal and identifying a portion of the signal corresponding to the Golay preamble.

Statement 16: The system according to any of the preceding Statements 13-15, wherein the communication channel comprises a mud flow path, and wherein the Golay preamble waveform has a flat power spectrum.

Statement 17: The system according to any of the preceding Statements 13-16, wherein estimating the characteristic of the communication channel comprises estimating a mud channel response.

Statement 18: The system according to any of the preceding Statements 13-17, wherein the characteristic of the communication channel comprises a transfer function.

Statement 19: A non-transitory computer-readable storage medium having stored therein instructions which, when executed by a processor, cause the processor to perform operations comprising: obtaining data associated with a signal received by a transducer a first location within a wellbore from a second communications device located at a second location within the wellbore, the signal comprising a Golay preamble waveform, the Golay preamble waveform being based on Golay complementary codes, detecting, based on the data, the Golay preamble waveform in the signal, and based on the detected Golay preamble waveform, estimating a characteristic of a communication channel between the first location and the second location.

Statement 20: The non-transitory computer-readable storage medium according to Statement 19, storing additional instructions which, when executed by the processor, cause the processor to perform operations comprising: selecting, based on the detected Golay preamble waveform, a portion of the signal for channel estimation, the portion comprising one or more data symbols, and estimating, based on the selected portion, a mud channel.

Statement 21: The non-transitory computer-readable storage medium according to Statement 19 or 20, wherein the communication channel comprises a mud flow path, and wherein detecting the Golay preamble waveform comprises separating the Golay preamble waveform from data symbols in the signal and identifying a portion of the signal corresponding to the Golay preamble waveform.

Statement 22: The non-transitory computer-readable storage medium according to any of the preceding Statements 19-21, wherein the Golay preamble waveform has a flat power spectrum and the second device comprises a pulser, the non-transitory computer-readable storage medium storing additional instructions which, when executed by the processor, cause the processor to perform operations comprising: applying a filter to the signal prior to detecting the Golay preamble waveform.

Statement 23: The non-transitory computer-readable storage medium according to any of the preceding Statements 19-22, wherein the first location is located about a surface location of the wellbore and the second location is a downhole location of the wellbore.

Statement 24: The non-transitory computer-readable storage medium according to any of the preceding Statements 19-23, wherein the first location is a downhole location of the wellbore and the second location is located about a surface location of the wellbore.

Statement 25: The non-transitory computer-readable storage medium according to any of the preceding Statements 19-24, wherein at least one of the first device and the second device comprises at least one of a processor and a pulser.

Statement 26: The non-transitory computer-readable storage medium according to any of the preceding Statements 19-25, storing additional instructions which, when executed by the processor, cause the processor to perform operations comprising: applying a pump filter to the signal prior to detecting the Golay preamble waveform.

I claim:

1. A method comprising:
   receiving, by a first device located at a first location within a wellbore from a second device located at a second location within the wellbore, a signal comprising a Golay preamble waveform, the Golay preamble waveform being based on Golay complementary codes, wherein the signal is a pressure wave and is a pulse-position-modulated signal;
   detecting, with the first device, the Golay preamble waveform in the signal; and
   estimating, based on the detected Golay preamble waveform, a characteristic of a communication channel between the first location and the second location.

2. The method of claim 1, wherein detecting the Golay preamble waveform comprises separating the Golay preamble waveform from data symbols in the signal and identifying a portion of the signal corresponding to the Golay preamble waveform.

3. The method of claim 1, wherein the first location is within a proximity to a surface location of the wellbore and wherein the second location is a downhole location of the wellbore.

4. The method of claim 1, wherein the Golay preamble waveform has a flat power spectrum.

5. The method of claim 1, wherein the communication channel comprises a mud flow path, and wherein estimating the characteristic of the communication channel comprises estimating a mud channel response.

6. The method of claim 1, wherein the characteristic of the communication channel comprises a transfer function.

7. The method of claim 1, wherein detecting the Golay preamble waveform comprises identifying a tail end of the Golay preamble waveform in the signal.

8. The method of claim 1, wherein detecting the Golay preamble waveform comprises identifying a location of the Golay preamble waveform within the signal.

9. The method of claim 1, further comprising:
   selecting, based on the detected Golay preamble waveform, a portion of the signal for channel estimation, the portion comprising one or more data symbols; and
   estimating, based on the selected portion, a mud channel characteristic.

10. The method of claim 1, further comprising applying a filter to the signal prior to detecting the Golay preamble waveform.

11. The method of claim 1, wherein the detecting and estimating steps are performed during a drilling operation, the method further comprising:
    determining one or more downhole characteristics of the wellbore, the downhole characteristics including at least one of a formation fluid density, a temperature, a pressure, resistivity, porosity, azimuthal orientation of a drill bit, and azimuthal orientation of a drill string.

12. The method of claim 1, wherein the characteristic of the communication channel is at least one of a noise, a distortion, a delay, an attenuation, a phase shift, a signal-to-noise ratio, an impulse response, or an impedance parameter.

13. A system comprising:
    a transducer residing at a first location within a wellbore and configured to receive, from a communications component at a second location within the wellbore, a signal comprising a Golay preamble waveform, the Golay preamble waveform being based on Golay complementary codes, wherein the signal is a pressure wave and is a pulse-position-modulated signal;
    a processor coupled with the transducer and configured to receive the signal from the transducer; and
    a non-transitory computer-readable storage medium having stored therein instructions which, when executed by the processor, cause the processor to perform operations comprising:
    detecting the Golay preamble waveform in the signal; and
    based on the detected Golay preamble waveform, estimating a characteristic of a communication channel between the first location and the second location.

14. The system of claim 13, wherein detecting the Golay preamble waveform comprises separating the Golay preamble waveform from data symbols in the signal and identifying a portion of the signal corresponding to the Golay preamble.

15. The system of claim 13, wherein the communication channel comprises a mud flow path, and wherein the Golay preamble waveform has a flat power spectrum.

16. The system of claim 15, wherein estimating the characteristic of the communication channel comprises estimating a mud channel response.

17. The system of claim 13, wherein the characteristic of the communication channel comprises a transfer function.

18. A non-transitory computer-readable storage medium having stored therein instructions which, when executed by a processor, cause the processor to perform operations comprising:
    obtaining data associated with a signal received by a transducer located at a first location within a wellbore from a second communications device located at a second location within the wellbore, the signal comprising a Golay preamble waveform and data symbols, the Golay preamble waveform being based on Golay complementary codes, wherein the signal is a pressure wave and is a pulse-position-modulated signal;

detecting, based on the data, the Golay preamble waveform in the signal; and estimating, based on the detected Golay preamble waveform, a characteristic of a communication channel between the first location and the second location.

19. The non-transitory computer-readable storage medium of claim 18, storing additional instructions which, when executed by the processor, cause the processor to perform operations comprising:

selecting, based on the detected Golay preamble waveform, a portion of the signal for channel estimation, the portion comprising one or more data symbols; and estimating, based on the selected portion, a mud channel.

20. The non-transitory computer-readable storage medium of claim 18, wherein the communication channel comprises a mud flow path, and wherein detecting the Golay preamble waveform comprises separating the Golay preamble waveform from the data symbols in the signal and identifying a portion of the signal corresponding to the Golay preamble waveform.

21. The non-transitory computer-readable storage medium of claim 18, wherein the Golay preamble waveform has a flat power spectrum and the second device comprises a pulser, the non-transitory computer-readable storage medium storing additional instructions which, when executed by the processor, cause the processor to perform operations comprising:

applying a pump filter to the signal prior to detecting the Golay preamble waveform.

* * * * *